US012277926B2

(12) United States Patent
Cho et al.

(10) Patent No.: US 12,277,926 B2
(45) Date of Patent: Apr. 15, 2025

(54) INTELLIGENT MEDICAL SPEECH AUTOMATIC RECOGNITION METHOD AND SYSTEM THEREOF

(71) Applicant: China Medical University, Taichung (TW)

(72) Inventors: Der-Yang Cho, Taichung (TW); Kai-Cheng Hsu, Taichung (TW); Ya-Lun Wu, Taichung (TW); Kai-Ching Chen, Taichung (TW)

(73) Assignee: China Medical University, Taichung (TW)

( * ) Notice: Subject to any disclaimer, the term of this patent is extended or adjusted under 35 U.S.C. 154(b) by 405 days.

(21) Appl. No.: 17/488,658

(22) Filed: Sep. 29, 2021

(65) Prior Publication Data

US 2022/0406296 A1 Dec. 22, 2022

(30) Foreign Application Priority Data

Jun. 22, 2021 (TW) ................. 110122805

(51) Int. Cl.
  *G10L 15/06* (2013.01)
  *G10L 15/22* (2006.01)
  *G10L 15/26* (2006.01)
  *G10L 21/0208* (2013.01)

(52) U.S. Cl.
  CPC ............ *G10L 15/063* (2013.01); *G10L 15/22* (2013.01); *G10L 15/26* (2013.01); *G10L 21/0208* (2013.01)

(58) Field of Classification Search
  None
  See application file for complete search history.

(56) References Cited

U.S. PATENT DOCUMENTS

| 11,886,813 B2 * | 1/2024 | Courtland | G06N 3/084 |
| 2019/0122766 A1 * | 4/2019 | Strader | G16H 40/63 |
| 2022/0083733 A1 * | 3/2022 | Zhang | G06F 40/242 |

FOREIGN PATENT DOCUMENTS

| CN | 107533848 A | * | 1/2018 | ......... G10L 21/0208 |
| CN | 112735418 A | | 4/2021 | |
| TW | 201342362 A | | 10/2013 | |

OTHER PUBLICATIONS

Translation CN 107533848—Chi published Jan. 2018.*

(Continued)

*Primary Examiner* — Pierre Louis Desir
*Assistant Examiner* — Kristen Michelle Masters

(57) ABSTRACT

An intelligent medical speech automatic recognition method includes performing a first model training step, a second model training step, a voice receiving step, a signal pre-treatment step and a transforming step. The first model training step is performed to train a generic statement data and a medical statement data of a database to establish a first model. The second model training step is performed to train a medical textbook data of the database to establish a second model. The voice receiving step is performed to receive a speech signal. The signal pre-treatment step is performed to receive the speech signal from the voice receiver and transform the speech signal into a to-be-recognized speech signal. The transforming step is performed to transform and recognize the to-be-recognized speech signal into a complete sentence writing character according to the first model and the second model.

2 Claims, 3 Drawing Sheets

(56) References Cited

OTHER PUBLICATIONS

Healthcare+ Expo, "Al Center for Medical Diagnosis of China Medical University Hospital: 'Nan Nursing voice assistant' helps nurses reduce tedious work", published on Oct. 28, 2020, webpage, pp. 1-2, accessed at https://expo.taiwan-healthcare.org/zh/news_detail.php REFDOCID-0qiwq5gd0f0utiwu, Taiwan, R.O.C.

* cited by examiner

INTELLIGENT MEDICAL SPEECH AUTOMATIC RECOGNITION METHOD AND SYSTEM THEREOF

RELATED APPLICATIONS

This application claims priority to Taiwan Application Serial Number 110122805, filed Jun. 22, 2021, which is herein incorporated by reference.

BACKGROUND

Technical Field

The present disclosure relates to a speech automatic recognition method and a system thereof. More particularly, the present disclosure relates to an intelligent medical speech automatic recognition method and a system thereof.

Description of Related Art

The caregiver records the vital signs, the lesion or the emergencies of the patients as a medical record while taking care of the patient by telephone, paper or electronic file to handover to another caregiver. The custom or form of every caregiver is different from others. If the caregiver misunderstands the medical record recorded by the previous caregiver, the caregiver may take care of the patient in a wrong way.

Thus, developing an intelligent medical speech automatic recognition method and a system thereof with unified format and without handwriting or typing the medical record are commercially desirable.

SUMMARY

According to one aspect of the present disclosure, an intelligent medical speech automatic recognition method includes performing a first model training step, a second model training step, a voice receiving step, a signal pre-treatment step and a transforming step. The first model training step is performed to drive a processing unit to train a generic statement data and a medical statement data of a database to establish a first model. The second model training step is performed to drive the processing unit to train a medical textbook data of the database to establish a second model. The voice receiving step is performed to drive a voice receiver to receive a speech signal, wherein the voice receiver is signally connected to the processing unit. The signal pre-treatment step is performed to drive the processing unit to receive the speech signal from the voice receiver and transform the speech signal into a to-be-recognized speech signal. The transforming step is performed to drive the processing unit to transform and recognize the to-be-recognized speech signal into a complete sentence writing character according to the first model and the second model. The generic statement data, the medical statement data and the medical textbook data are different from each other.

According to another aspect of the present disclosure, an intelligent medical speech automatic recognition system includes a voice receiver, a database and a processing unit. The voice receiver is configured to receive a speech signal. The database is configured to access a generic statement data, a medical statement data and a medical textbook data. The processing unit is signally connected to the voice receiver and the database. The processing unit receives the speech signal from the voice receiver, the generic statement data, the medical statement data and the medical textbook data and is configured to implement an intelligent medical speech automatic recognition method including performing a first model training step, a second model training step, a signal pre-treatment step and a transforming step. The first model training step is performed to train the generic statement data and the medical statement data of the database to establish a first model, and store the first model into the database. The second model training step is performed to train the medical textbook data of the database to establish a second model, and store the second model into the database. The signal pre-treatment step is performed to transform the speech signal into a to-be-recognized speech signal. The transforming step is performed to transform and recognize the to-be-recognized speech signal into a complete sentence writing character according to the first model and the second model. The generic statement data, the medical statement data and the medical textbook data are different from each other.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
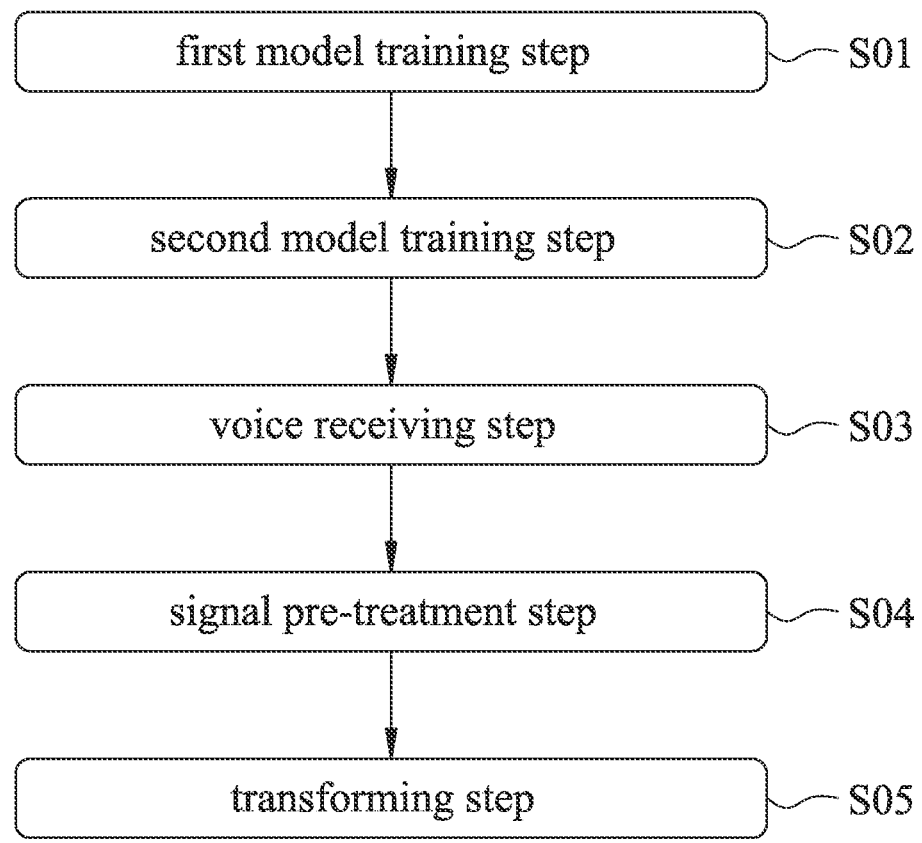
FIG. 1 shows a flow chart of an intelligent medical speech automatic recognition method according to a first embodiment of the present disclosure.

Please refer to FIG. 1. FIG. 1 shows a flow chart of an intelligent medical speech automatic recognition method 100 according to a first embodiment of the present disclosure. The intelligent medical speech automatic recognition method 100 includes performing a first model training step S01, a second model training step S02, a voice receiving step S03, a signal pre-treatment step S04 and a transforming step S05. The first model training step S01 is performed to drive a processing unit to train a generic statement data and a medical statement data of a database to establish a first model. The second model training step S02 is performed to drive the processing unit to train a medical textbook data of the database to establish a second model. The voice receiving step S03 is performed to drive a voice receiver to receive a speech signal, wherein the voice receiver is signally connected to the processing unit. The signal pre-treatment step S04 is performed to drive the processing unit to receive the speech signal from the voice receiver and transform the speech signal into a to-be-recognized speech signal. The transforming step S05 is performed to drive the processing unit to transform and recognize the to-be-recognized speech signal into a complete sentence writing character according to the first model and the second model. The generic statement data, the medical statement data and the medical textbook data are different from each other. Thus, the intelligent medical speech automatic recognition method 100 of the present disclosure can transform statements in the medical field into the complete sentence writing character. Each of the steps of the intelligent medical speech automatic recognition method is described in more detail below.

Figure 2:
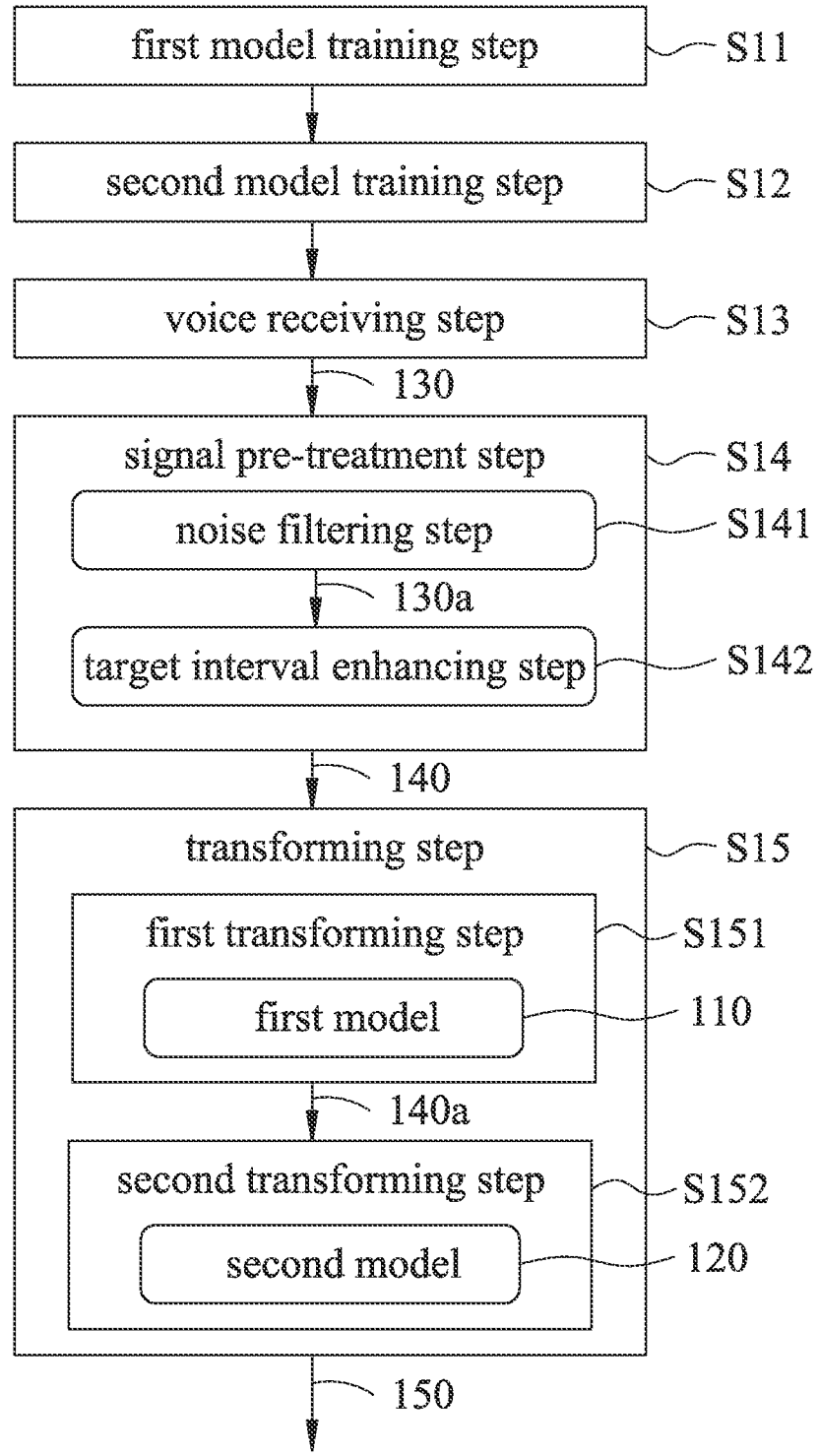
FIG. 2 shows a flow chart of an intelligent medical speech automatic recognition method according to a second embodiment of the present disclosure.

Please refer to FIG. 2. FIG. 2 shows a flow chart of an intelligent medical speech automatic recognition method 100a according to a second embodiment of the present disclosure. The intelligent medical speech automatic recognition method 100a includes performing a first model training step S11, a second model training step S12, a voice receiving step S13, a signal pre-treatment step S14 and a transforming step S15. The first model training step S11 is performed to drive a processing unit to train a generic statement data and a medical statement data of a database to establish a first model 110. The second model training step S12 is performed to drive the processing unit to train a medical textbook data of the database to establish a second model 120. The voice receiving step S13 is performed to drive a voice receiver to receive a speech signal 130, wherein the voice receiver is signally connected to the processing unit. The signal pre-treatment step S14 is performed to drive the processing unit to receive the speech signal 130 from the voice receiver and transform the speech signal 130 into a to-be-recognized speech signal 140. The transforming step S15 is performed to drive the processing unit to transform and recognize the to-be-recognized speech signal 140 into a complete sentence writing character 150 according to the first model 110 and the second model 120. The generic statement data, the medical statement data and the medical textbook data are different from each other.

The generic statement data includes a plurality of generic vocabulary speech signals and a plurality of generic vocabulary writing characters corresponding to the generic vocabulary speech signals. The medical statement data includes a plurality of medical vocabulary speech signals and a plurality of medical vocabulary writing characters corresponding to the medical vocabulary speech signals.

In detail, the generic statement data includes vocabulary in common and the non-specific field. The generic vocabulary speech signals can be an audio signal waveform of the vocabulary in common and the non-specific field which is received by the voice receiver. The generic vocabulary writing characters can be a text data of the generic vocabulary. The medical statement data includes vocabulary in the medical field. The medical vocabulary speech signals can be an audio signal waveform of the vocabulary in the medical field which is received by the voice receiver, and the medical vocabulary writing characters can be a text data of the medical vocabulary. The vocabulary in the medical field can be Chinese words, English words or hybrid vocabulary with Chinese words and English words. The medical textbook data includes a plurality of statement word data in the medical field and an audio signal waveform of statement in the medical field received by the voice receiver, and the statement in the medical field includes punctuation marks. The statement word data in the medical field can be sentence in a medical record textbook. The first model 110 which is trained by the first model training step S11 is configured to recognize the generic vocabulary and the medical field vocabulary. The second model 120 which is trained by the second model training step S12 is configured to recognize the position of the punctuation in the statement. The voice receiving step S13 is for the caregiver to record the medical record and transform the medical record into text via the voice receiver.

The signal pre-treatment step S14 can include a noise filtering step S141 and a target interval enhancing step S142. The noise filtering step S141 is performed to drive the processing unit to filter out a noise of the speech signal 130, and generate a human voice interval signal 130a. The target interval enhancing step S142 is performed to drive the processing unit to enhance the human voice interval signal 130a according to a human voice frequency band, and generate the to-be-recognized speech signal 140. Moreover, besides the statement to be transformed, the speech signal 130 further includes other background sound or noise. The noise filtering step S141 of the present disclosure removes the signal of the background sound and noise and reserves the human voice interval signal 130a. The target interval enhancing step S142 enhances the signal in the range of the human voice frequency and generates the to-be-recognized speech signal 140. Thus, the intelligent medical speech automatic recognition method 100a of the present disclosure enhances the accuracy of the speech recognition by the signal pre-treatment step S14.

The transforming step S15 includes a first transforming step S151 and a second transforming step S152. The first transforming step S151 is performed to drive the processing unit to transform the to-be-recognized speech signal 140 into a writing character 140a according to the first model 110. The second transforming step S152 is performed to drive the processing unit to transform the writing character 140a into the complete sentence writing character 150 according to the second model 120. In other words, the first transforming step S151 can transform a part of the to-be-recognized speech signal 140, which is corresponding to the generic vocabulary and the medical field vocabulary, after the pre-treatment process into the writing character 140a directly, insert the punctuation into the writing character 140a and generate the complete sentence writing character 150.

Thus, the intelligent medical speech automatic recognition method 100a of the present disclosure can transform the speech signal 130 into the complete sentence writing character 150 included punctuation directly without transforming the speech signal 130 into a phonography and transforming the phonography into the writing text.

Figure 3:
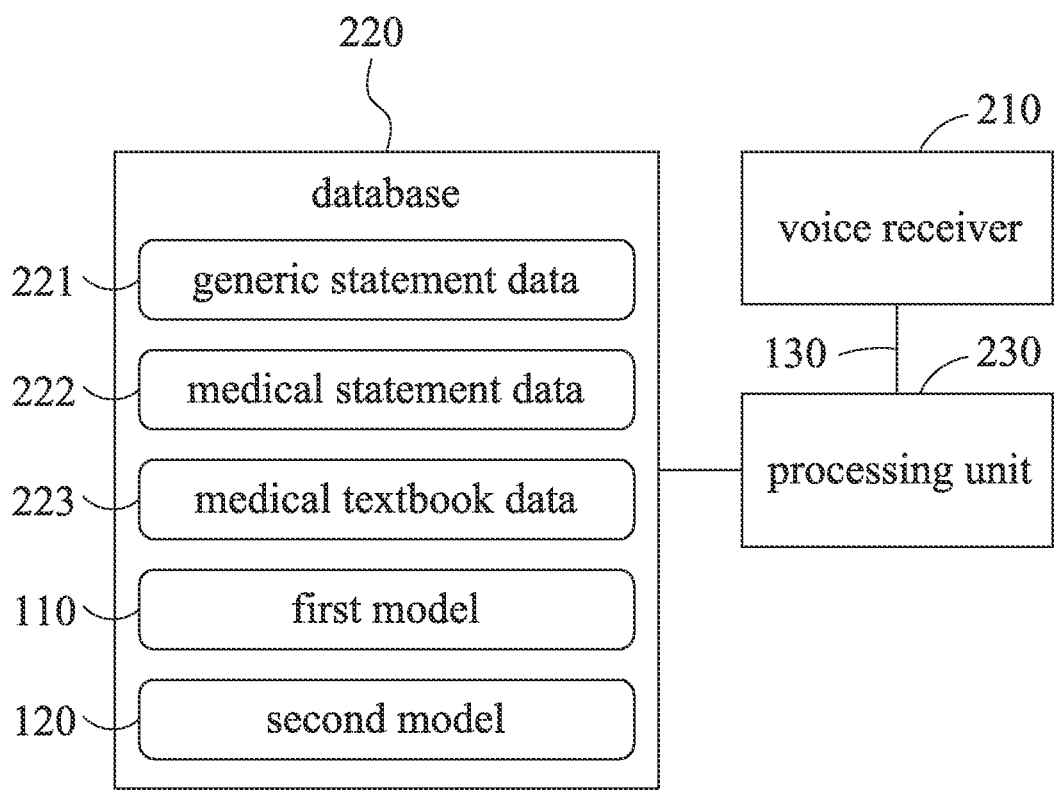
FIG. 3 shows a block diagram of an intelligent medical speech automatic recognition system according to a third embodiment of the present disclosure.

Please refer to FIG. 2 and FIG. 3. FIG. 3 shows a block diagram of an intelligent medical speech automatic recognition system 200 according to a third embodiment of the present disclosure. The intelligent medical speech automatic recognition system 200 includes a voice receiver 210, a database 220 and a processing unit 230. The voice receiver 210 is configured to receive a speech signal 130. The database 220 is configured to access a generic statement data 221, a medical statement data 222 and a medical textbook data 223. In detail, the voice receiver 210 can be a microphone. The database 220 can be a memory or other data storing element.

The processing unit 230 is signally connected to the voice receiver 210 and the database 220. The processing unit 230 receives the speech signal 130 from the voice receiver 210, the generic statement data 221, the medical statement data 222 and the medical textbook data 223, and is configured to implement the first model training step S11, the second model training step S12, the signal pre-treatment step S14 and the transforming step S15. In detail, the processing unit 230 can be a microprocessor, a central processing unit (CPU) or other electronic computing processor, but the present disclosure is not limited thereto.

The first model training step S11 is performed to train the generic statement data 221 and the medical statement data 222 of a database 220 to establish a first model 110, and store the first model 110 into the database 220. The second model training step S12 is performed to train the medical textbook data 223 of the database 220 to establish a second model 120, and store the second model 120 into the database 220. The signal pre-treatment step S14 is performed to transform the speech signal 130 into a to-be-recognized speech signal 140. The transforming step S15 is performed to transform and recognize the to-be-recognized speech signal 140 into a complete sentence writing character 150 according to the first model 110 and the second model 120. The generic statement data 221, the medical statement data 222 and the medical textbook data 223 are different from each other.

In other words, the intelligent medical speech automatic recognition system 200 trains the generic statement data 221 and the medical statement data 222 of the database 220 to generate the first model 110, and trains the medical textbook data 223 to generate the second model 120 in advance. Then, the intelligent medical speech automatic recognition system 200 stores the first model 110 and the second model 120 into the database 220. The caregiver can record the medical record and transform the medical record into text via the voice receiver 210. For example, in the intelligent medical speech automatic recognition system 200, the caregiver can record the statement of "the patient is lying in bed and resting now GCSE4M6V5 breathing smoothly" via the voice receiver 210, and the voice receiver 210 generates the speech signal 130 corresponding to the aforementioned statement. The part of the speech signal 130 corresponding to the generic vocabulary and the medical field vocabulary is transformed into the writing character 140a (i.e., "the patient is lying in bed and resting now GCSE4M6V5 breathing smoothly") consisted by the generic vocabulary (i.e., "patient", "lying", "bed", "resting", "breathing", "smoothly") and the medical field vocabulary (i.e., "GCS", "E4M6V5", GCS is Glasgow Coma Scale, and E4M6V5 is the index of the GCS) via the first model 110. Then, the writing character 140a can be transformed into the complete sentence writing character 150 (i.e., "the patient is lying in bed and resting now, GCS: E4M6V5, breathing smoothly") via the second model 120. Thus, the intelligent medical speech automatic recognition system 200 of the present disclosure can let the caregiver dictate the medical record and transform the medical record into the complete sentence writing character 150, thereby saving the time of hand writing the medical record or typing the medical record into the computer, and avoiding the mistake resulting by the dictation handover.

According to the aforementioned embodiments and examples, the advantages of the present disclosure are described as follows.

1. The intelligent medical speech automatic recognition method of the present disclosure can transform statements in the medical field into the complete sentence writing character.

2. The intelligent medical speech automatic recognition method of the present disclosure enhances the accuracy of the speech recognition by the signal pre-treatment step.

3. The intelligent medical speech automatic recognition method of the present disclosure can transform the speech signal into the complete sentence writing character included punctuation directly without transforming the speech signal into a phonography and transforming the phonography into the writing text.

4. The intelligent medical speech automatic recognition system of the present disclosure can let the caregiver dictate the medical record and transform the medical record into the complete sentence writing character, thereby saving the time of hand writing the medical record or typing the medical record into the computer, and avoiding the mistake resulting by the dictation handover.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An intelligent medical speech automatic recognition method, comprising:
performing a first model training step to drive a processing unit to train a generic statement data and a medical statement data of a database to establish a first model;
performing a second model training step to drive the processing unit to train a medical textbook data of the database to establish a second model;
performing a voice receiving step to drive a voice receiver to receive a speech signal, wherein the voice receiver is signally connected to the processing unit;
performing a signal pre-treatment step to drive the processing unit to receive the speech signal from the voice receiver and transform the speech signal into a to-be-recognized speech signal; and
performing a transforming step to drive the processing unit to transform and recognize the to-be-recognized speech signal into a complete sentence writing character according to the first model and the second model;
wherein the generic statement data, the medical statement data and the medical textbook data are different from each other;
wherein the transforming step comprises:
performing a first transforming step to drive the processing unit to transform the to-be-recognized speech signal into a writing character according to the first model; and
performing a second transforming step to drive the processing unit to transform the writing character into the complete sentence writing character according to the second model without transforming the speech signal into a phonography;
wherein the complete sentence writing character comprises at least one punctuation;

wherein the first model is trained to recognize a generic vocabulary and a medical field vocabulary;

wherein the medical statement data comprises a plurality of medical vocabulary speech signals and a plurality of medical vocabulary writing characters corresponding to the medical vocabulary speech signals; and wherein the medical vocabulary writing characters comprise at least one hybrid vocabulary with Chinese words and English words;

wherein the signal pre-treatment step comprises:
  performing a noise filtering step to drive the processing unit to filter out a noise of the speech signal, and generate a human voice interval signal; and
  performing a target interval enhancing step to drive the processing unit to enhance the human voice interval signal according to a human voice frequency band, and generate the to-be-recognized speech signal;

wherein the generic statement data comprises a plurality of generic vocabulary speech signals and a plurality of generic vocabulary writing characters corresponding to the generic vocabulary speech signals; and wherein the first model training step, the second model training step, the voice receiving step, the signal pre-treatment step, the first transforming step and the second transforming step of the transforming step are performed in sequence.

2. An intelligent medical speech automatic recognition system, comprising:
  a voice receiver configured to receive a speech signal;
  a database configured to access a generic statement data, a medical statement data and a medical textbook data; and
  a processing unit signally connected to the voice receiver and the database, wherein the processing unit receives the speech signal from the voice receiver, the generic statement data, the medical statement data and the medical textbook data and is configured to implement an intelligent medical speech automatic recognition method comprising:
    performing a first model training step to train the generic statement data and the medical statement data of the database to establish a first model, and store the first model into the database;
    performing a second model training step to train the medical textbook data of the database to establish a second model, and store the second model into the database;
    performing a signal pre-treatment step to transform the speech signal into a to-be-recognized speech signal; and
    performing a transforming step to transform and recognize the to-be-recognized speech signal into a complete sentence writing character according to the first model and the second model;

wherein the generic statement data, the medical statement data and the medical textbook data are different from each other;

wherein the transforming step comprises:
  performing a first transforming step to transform the to-be-recognized speech signal into a writing character according to the first model; and
  performing a second transforming step to transform the writing character into the complete sentence writing character according to the second model without transforming the speech signal into a phonography;

wherein the complete sentence writing character comprises at least one punctuation;

wherein the first model is trained to recognize a generic vocabulary and a medical field vocabulary;

wherein the medical statement data comprises a plurality of medical vocabulary speech signals and a plurality of medical vocabulary writing characters corresponding to the medical vocabulary speech signals; and wherein the medical vocabulary writing characters comprise at least one hybrid vocabulary with Chinese words and English words;

wherein the signal pre-treatment step comprises:
  performing a noise filtering step to filter out a noise of the speech signal, and generate a human voice interval signal; and
  performing a target interval enhancing step to enhance the human voice interval signal according to a human voice frequency band, and generate the to-be-recognized speech signal;

wherein the generic statement data comprises a plurality of generic vocabulary speech signals and a plurality of generic vocabulary writing characters corresponding to the generic vocabulary speech signals; and wherein the first model training step, the second model training step, the signal pre-treatment step, the first transforming step and the second transforming step of the transforming step are performed in sequence.

* * * * *